Oct. 3, 1939. L. F. CURTIS Re. 21,222

SELECTIVITY CONTROL FOR RADIO

Original Filed Sept. 21, 1934 3 Sheets-Sheet 1

INVENTOR
LESLIE F. CURTIS
BY Laurence B. Dodds
ATTORNEY

Oct. 3, 1939. L. F. CURTIS Re. 21,222

SELECTIVITY CONTROL FOR RADIO

Original Filed Sept. 21, 1934 3 Sheets-Sheet 2

INVENTOR
LESLIE F. CURTIS
BY Laurence B. Dodds
ATTORNEY

SELECTIVITY CONTROL FOR RADIO

Original Filed Sept. 21, 1934 3 Sheets-Sheet 3

INVENTOR
LESLIE F. CURTIS
BY Laurence B. Dodds
ATTORNEY

Reissued Oct. 3, 1939

Re. 21,222

UNITED STATES PATENT OFFICE 21,222

SELECTIVITY CONTROL FOR RADIO

Leslie F. Curtis, Great Neck, N. Y., assignor, by mesne assignments, to Hazeltine Corporation, Jersey City, N. J., a corporation of Delaware Original No. 2,033,330, dated March 10, 1936, Serial No. 744,892, September 21, 1934. Application for reissue September 11, 1937, Serial No. 163,442

24 Claims. (Cl. 179—171)

Figure 1:
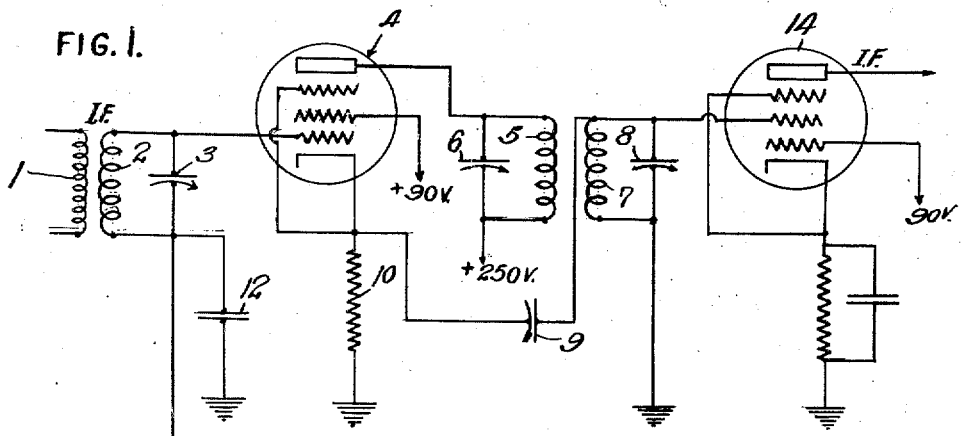
Figure 6:
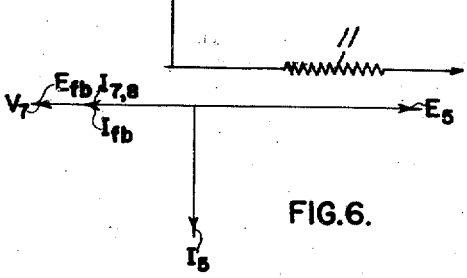

This invention relates to radio receivers and related equipment and more particularly to superheterodyne receivers in which the overall selectivity may be altered to suit changing requirements. The intermediate frequency amplifier of a superheterodyne usually consists of a number of circuits tuned to a particular frequency and the response curve of the amplifier has its highest point at that frequency. For adjacent frequencies the response is not so great and the curve slopes off on either side. Such a curve would indicate a selective receiver, but one in which tonal quality was sacrificed for selectivity. This condition is known as "side-band cutting" and results in a thin, colorless audio reproduction. Commercial practice has been to compromise these conflicting requirements, and to produce a receiver in which neither the selectivity nor the tone is all that may be desired. The intermediate-frequency amplifier was provided with a band-pass selector which was adjusted and remained fixed regardless of insufficient selectivity to separate a weak, distant signal from adjoining signals, and regardless of the full tonal possibilities available in a strong local signal.

Band-pass selector systems of conventional design usually comprise a pair of resonant circuits tuned to the same or slightly different frequencies and suitably coupled inductively, capacitively, or by a combination of these individual couplings. The two circuits are commonly referred to as input and output or primary and secondary circuits, depending upon which circuit is connected to the source of the high-frequency signals comprising the band to be transmitted. The responsiveness of this type of selector system is substantially constant over a band of frequencies in the vicinity of resonance of the individual circuits, while signals of all other frequencies are sharply discriminated against and are attenuated to a substantial degree by the selector. In general, the width of the frequency band passed by such a selector may be varied either by changing the coupling between the two circuits or by relatively adjusting the resonant frequencies of the two circuits. The coupling referred to is non-directive in nature, that is, either circuit may be made the input circuit and the other the output circuit without substantially altering the characteristics of the system. Such a system is to be contrasted with the transconductive coupling from the input circuit to the output circuit of a vacuum-tube repeater wherein the coupling is primarily directive. Band-pass selector systems wherein the non-directive form of coupling is employed are, in general, subject to the limitation that only mechanical or relatively complicated non-mechanical expedients are known for adjusting the width of the frequency band to be transmitted. Further, the type of coupling referred to is inherently incapable of producing amplification of the transmitted signals in the coupling path between the input and output circuits of the system.

The object of this invention is to provide a radio receiver in which the overall selectivity may be varied in accordance with the incoming signal strength.

Another object is to provide radio or related apparatus in which the overall selectivity is automatically controlled in accordance with the incoming signal strength.

A further object is to provide radio apparatus in which an amplifier is adjustable with respect to selectivity by employing either positive or negative feedback.

Still a further object is to provide a radio receiver in which the overall selectivity is controlled through the action of an automatic volume control.

More particularly, it is an object of the invention to provide an improved band-pass selector system of the type described in which the width of the frequency band passed by the system may be varied by adjusting the transconductance of a directive coupling means included in the system.

In accordance with the invention, a selector system is provided having a pair of tuned circuits which are mutually coupled, the system having a feed-back path comprising a directive coupling between the tuned circuits. Such arrangement provides coupling paths between the tuned circuits which are substantially less frequency-selective than the tuned circuits. The tuned circuits and the coupling paths co-operate to provide a coupling reaction between the tuned circuits effective to vary the width of the band passed by the selector.

Figure 5:
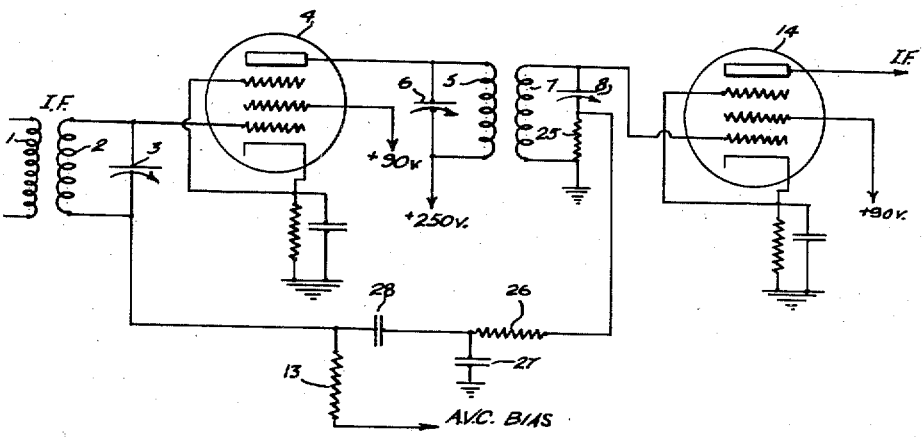
Figure 2:
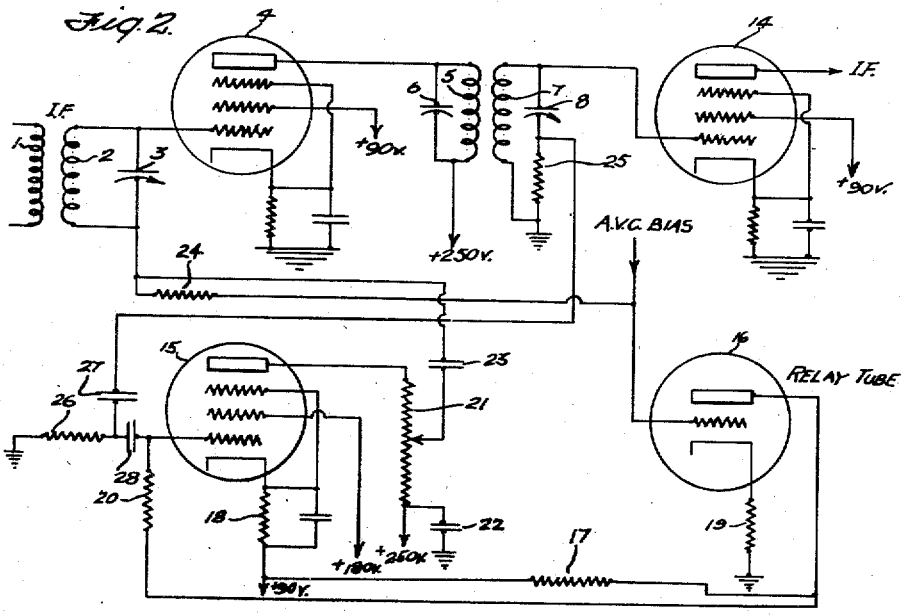
Figure 3:
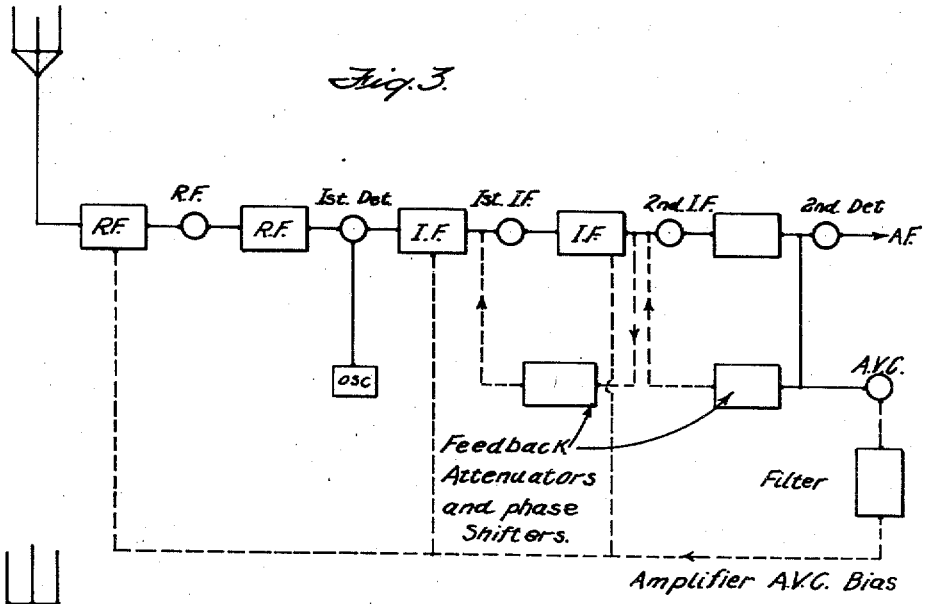
Figure 4:
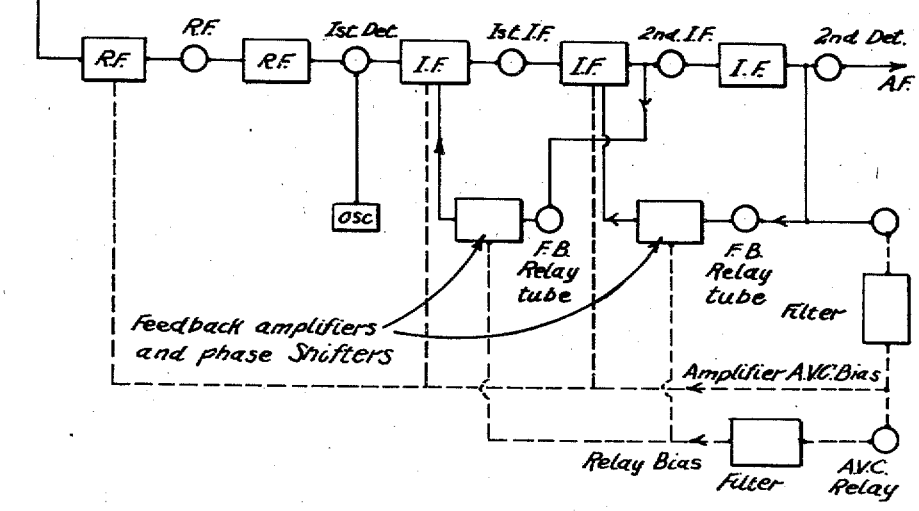

Other objects and advantages will in part be stated and in part be obvious when the following specification is read in connection with the accompanying drawings, in which:

Fig. 1 is a diagrammatic representation of the preferred form of the invention in which a positive feedback is applied to an intermediate-frequency amplifier; Fig. 2 is a diagram of an intermediate-frequency amplifier in which negative feedback is used to control the selectivity; Fig. 3 is a block diagram of a receiver designed to employ a positive feedback in the intermediate-frequency amplifier; Fig. 4 is a block diagram of a receiver in which a negative feedback is employed in the intermediate-frequency amplifier; Fig. 5 is a diagrammatic representation of an alternative form of the invention in which a positive feedback is applied to an intermediate-frequency amplifier; and Figs 6, 7, 8, and 9 illustrate certain operating characteristics of the band-pass selector system shown in Fig. 2.

Figs. 1 and 5 show systems of selectivity control using positive feedback in which inherently broad tuned amplifiers may be made to tune more sharply as requirements change.

Referring to Fig. 1 in more detail, the numeral 1 represents the primary of an intermediate frequency transformer having a secondary 2. A variable condenser 3 tunes the secondary circuit to the desired intermediate frequency of the amplifier. The control grid of an amplifier tube 4 receives the output of the tuned secondary circuit. The tube 4 may be of the type commercially designated as "58" and is connected in a well-known manner to function as an amplifier, the particular connections forming no part of this invention. The amplified output of tube 4 passes to a tuned primary circuit comprising the transformer primary 5, tuned by the variable condenser 6. The transformer secondary 7 is likewise tuned by the variable condenser 8. A small condenser 9 is connected between the ungrounded side of secondary circuit 7—8 and the cathode of tube 4. The cathode current of tube 4 is returned to ground through resistance 10, and the voltage drop across resistance 10 provides the necessary minimum bias for the grid of tube 4. The voltage developed across the secondary 7—8 is approximately 90° out of phase with the input voltage supplied by the circuit 2—3. The condenser 9 and the resistance 10 form a phase correction and amplitude adjusting circuit which applies between the cathode of tube 4 and ground a feedback voltage in correct phase which effectively increases the signal voltage between grid and cathode. A supplemental phase correction circuit such as is shown and explained in connection with Fig. 5 may be employed if necessary for correcting minor phase differences due to stray capacities and such. The resistance 11 is the usual filter resistor employed in automatic volume control circuits. A bypass condenser 12 is connected to the low potential side of the secondary circuit 2—3.

Fig. 2 shows an alternative system of selectivity control in which a sharply tuned amplifier may be broadened for reception of strong signals. The components of the amplifier proper perform the same functions as in the showing of Figs. 1 and 5, and like parts in Figs. 1, 2 and 5 bear the same reference characters. The voltage across the resistance 25 is fed through condenser 27 which forms a portion of a phase correction circuit including resistance 26. From condenser 27 the voltage goes through a coupling condenser 28 to the control grid of the feedback amplifier tube 15. At such times when no automatic volume control bias appears, i. e. when the incoming signal is weak, the tube 15 is given a high negative bias, derived as follows: The automatic volume control bias is applied to the control grid of a relay tube 16. The plate of tube 16 is connected through a resistance 17 to a 90-volt source which is also connected to the cathode of the feedback amplifier tube 15. The tubes 15 and 16 have a minimum bias obtained by the drop across resistances 18 and 19 respectively. A lead including a filter resistance 20 connects the control grid of tube 15 with the plate end of resistance 17. The plate current of tube 16 flows across resistance 17 and the bias on the grid of tube 15 is determined by the resulting voltage drop. When the automatic volume control bias is lowest, the tube 16 has a large plate current and the resulting voltage drop across resistance 17 places a high negative bias on the grid of tube 15, which then passes substantially no feedback voltage. Conversely, when the automatic volume control bias is greatest, tube 16 has very little plate current. The voltage drop across resistance 17 is then practically zero, the added negative bias is removed from tube 15, and there exists maximum amplification of the feedback voltage. Any intermediate automatic volume control bias produces a simultaneous change in the value of the amplified feedback voltage. The output of tube 15 which constitutes the amplifier feedback voltage is connected to a potentiometer 21. A bypass condenser 22 is connected between the supply end of potentiometer 21 and ground. The slider arm of potentiometer 21 takes off any desired portion of the amplified feedback voltage and it is fed through a coupling condenser 23 to the control grid of tube 4. Two feedback amplifier tubes in cascade may be employed in case a greater amplification is desired. The automatic volume control system controls the tube 4 in the usual manner through the lead including the filter resistor 24.

Figs. 3 and 4 are block diagrams of the system which show a positive and a negative feedback respectively in radio receivers.

Fig. 5 shows a modification of the positive feedback system shown in Fig. 1. A resistance 25 is serially included in the circuit 7—8, and has one end grounded. The voltage appearing across resistance 25 is taken off the ungrounded end of the resistance. This voltage will be approximately 90° ahead of the phase of the voltage appearing across the secondary winding 7, and is led to an auxiliary phase correction circuit comprising resistance 26 and condenser 27. The auxiliary correction circuit is employed only to compensate for small phase changes due to stray capacities and such incidental circumstances, and under some conditions will not be needed. For incidental phase corrections of opposite sign the positions in the circuit of resistance 26 and condenser 27 will be reversed. A blocking condenser 28 of a value large enough to readily pass the modulated intermediate frequency is connected to the phase shifting circuit, and the control grid of tube 4 is connected to the other side of condenser 28. The automatic volume control bias is fed through a resistance 13 of large value which is connected between the control grid of tube 4 and condenser 28. The voltage appearing across the secondary 7 is amplified by the tube 14 and may be passed to a succeeding stage, not shown.

High fidelity and extreme selectivity are not compatible. Side band cutting due to extreme selectivity may be reduced by over-coupling the tuned circuits, thereby obtaining a "double peaked" or "flat topped" selectivity curve which is perfectly satisfactory when receiving strong signals. For weak distant stations a much greater selectivity is needed to avoid adjacent channel interference from stronger signals.

While this interference may be reduced by employing a tone control to dampen the higher audio-frequencies, the output remains distorted to a large extent. Another remedy has been to vary the selectivity of a receiver through mechanically changing the degree of coupling between tuned circuits by ganging adjustable elements to control the spacing of intermediate-frequency amplifier coils. This last method is mechanically cumbersome and prone to get out of adjustment. In the present invention a single manual or automatic adjustment of feedback in an amplifier may be used to control the side band cutting and so control the audio fidelity of a radio receiver. The effect is similar to that obtained by manually adjusting the coupling between intermediate-frequency circuits, but without the mechanical complications of this method.

High fidelity response requires that the reproduction from 50 to 7500 cycles per second be uniform within a range of a few decibels. The feedback principle accomplishes this for strong signals, but allows the receiver to function with maximum selectivity on weak signals.

If the feedback voltage were introduced directly from the output to the input of a stage, there would be a phase difference of approximately 90° from the proper value. The effect of resistance 25 in series with condenser 8 forms a phase changing circuit as shown in Figs. 2 and 5, which provides the approximately correct phase of feedback, varying over the range of frequencies comprising the side bands of the modulated signal. In actual practice, the effective capacitance of resistors and other units, losses in the coils and shielding, which are not included in the original calculations, may cause a slight additional phase shift, clockwise or counter-clockwise. This may be corrected by a proper selection of resistance 26 and capacitance 27 in the phase correction circuit. Correction for an opposite phase may be made by reversing the relative position of these elements.

For a given selectivity curve, the mathematical product of basic amplification and feedback must remain constant. In an intermediate frequency amplifier having an automatic volume control, the basic amplification without feedback varies with the grid bias of the tubes. For weak signals the greatest selectivity is desired, while strong signals require less selectivity and more fidelity in transmission. This may be accomplished manually by an attenuator in the feedback circuit; however the preferred method is to automatically adjust the feedback to the correct value in proportion to received signal strength as shown in Figs. 1 and 2.

*Positive feedback*

The operation of the positive feedback circuit which is shown in Fig. 1 is as follows: The desired feedback voltage in correct amplitude and phase is obtained across resistance 10 by serially connecting the resistance 10 and condenser 9 between ground and the high potential side of the secondary circuit 7—8. This voltage is applied to the cathode of tube 4. The resistance 11 is a filter resistance, serving to keep high frequency voltages out of the balance of the automatic volume control system. The positive feedback is used to make the receiver more selective by symmetrical regeneration. A receiver employing this principle is originally constructed to have a broad selectivity curve, and to amplify the audio side bands of the signal in approximately an equal amount. The receiver will then reproduce with excellent fidelity, but will originally be lacking in selectivity. For a weak signal input, where selectivity is required, the positive feedback in correct phase peaks the selectivity curve by symmetrical regeneration. This peaking effect of a given feedback is greatest when the basic amplification is greatest. In an automatic volume control receiver the amplification is greatest when the signal is weak and thus the feedback is most effective in producing a sharp selectivity curve. Upon the occurrence of a strong signal, the amplification is low, the feedback has little effect on the selectivity, and the curve shape returns to approximately its normal form for the tuned circuit without a feedback. While the feedback may extend over more than one stage of the amplifier, it is then difficult to reinforce the 7000 cycle audio side band when an intermediate frequency of 456 kilocycles is used. Increasing the intermediate frequency sufficiently to accomplish this would probably place it in the broadcast band, and so produce other difficulties. The preferred method of accomplishing the desired result is to provide an individual feedback circuit for each stage as shown in Fig. 3.

*Negative feedback*

A receiver employing negative feedback to control selectivity, as is shown in Figs. 2 and 4, is originally constructed to have a sharp selectivity curve. Selectivity requisite to separating a weak signal from an adjacent stronger one is originally provided and when a strong station is received and tone becomes the paramount consideration, the selectivity curve is flattened sufficiently to insure substantially equal passage of the audio side bands of the modulated signal. This requires a wide range in the value of the feedback, and a feedback amplifier is provided to allow the desired range. A strong signal requires a heavy negative feedback to sufficiently depress the amplifier selectivity curve, while for a weak signal the feedback should be removed in order to provide maximum selectivity and amplification. As negative feedback is increased the amplifier selectivity curve will flatten and then assume the "double hump" characteristic of over-coupled circuits. This may be combined in the usual manner with the characteristic of preceding circuits to produce a flat-topped curve which is wide enough to avoid side band cutting. In this type of receiver, the automatic volume control bias determines the amount of negative feedback at a given time. In the positive feedback system, the ratio of feedback to signal is constant, and the automatic volume control bias regulates the amplification, which in turn determines the degree of effectiveness of the feedback in altering the selectivity of the amplifier.

In considering in detail the operation of the selector system of Fig. 2, it will first be assumed that a voltage having a frequency equal to the mean resonant frequency of the selector system is applied to the parallel resonant input circuit 5—6. The voltage appearing across inductance 5 is represented by the vector $E_5$ of Fig. 6. The current in inductance 5 is represented by the vector $I_5$ which lags the voltage $E_5$ by 90 degrees. There is induced in inductance 7 by the current $I_5$ a voltage $V_7$ which, due to the negative polarity of coupling between inductances 5 and 7, lags the current $I_5$ by 90 degrees. Since, at resonance, the inductive reactance of circuit 7—8 is equal to its capacitive reactance, the voltage $V_7$ causes a current $I_{78}$ to flow in this circuit which is in phase with the induced voltage $V_7$. The voltage which is fed back from circuit 7—8 is taken across resistor 25 and is thus in phase with the current $I_{78}$ in the circuit. This feed-back signal is subjected to a reversal of polarity in each of tubes 15 and 4 so that tube 4 supplies a feed-back current $I_{fb}$ in phase with the current $I_{78}$. Since the parallel impedance of circuit 5—6 is resistive at the resonant frequency, the feedback voltage $E_{fb}$ developed across the tuned circuit is in phase with the feed-back current $I_{fb}$. It is thus seen that, at the resonant frequency of the system, the system is degenerative, the feed-back voltage $E_{fb}$ across circuit 5—6 being displaced 180 degrees from the voltage $E_5$ across the input circuit of the selector.

Figure 7:
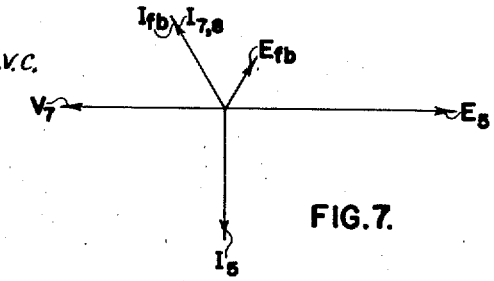

If a component of signal voltage having a frequency considerably higher than the mean resonant frequency of the selector system is applied to the input circuit 5—6, the phase relations of the voltages and currents are as shown by Fig. 7 of the drawings, wherein corresponding vectors are represented by similar reference characters. Under this condition, the series-reactance of circuit 7—8 is inductive so that the current $I_{78}$ lags the voltage $V_7$ by an angle approaching 90 degrees as a limit. Similarly, at such higher frequency, the parallel reactance of the circuit 5—6 is capacitive so that the feed-back voltage $E_{fb}$ developed thereacross by the current $I_{78}$ lags the current $I_{78}$ by an additional angle also approaching 90 degrees as a limit. It is seen that, for conditions illustrated, the phase of the vector $E_{fb}$ representing the feed-back voltage approaches that of the voltage $E_5$ across the selector input circuit so that the system is regenerative.

At the mean resonant frequency of the system, the circuit 7—8 has its minimum series impedance so that the current induced therein and the voltage appearing across resistor 25 are a maximum. Also, the parallel impedance of the circuit 5—6 is a maximum, so that the feed-back voltage developed thereacross is also a maximum. Therefore, the system is degenerative to the maximum degree at this frequency. At frequencies substantially above the resonant frequency of the system, the series impedance of circuit 7—8 is substantially greater and the parallel impedance of the circuit 5—6 is substantially less so that the value of the feed-back voltage is reduced. Therefore, the system is only slightly regenerative at such higher frequencies. At frequencies intermediate to those just discussed, the feed-back voltages have intermediate amplitudes and phase angles with respect to the voltages across the input circuit 5—6 and the feed-back characteristic of the system has a gradual transition from degeneration to regeneration. Obviously, at frequencies below the resonant frequencies of circuits 5—6 and 7—8 the same relationships between the magnitude and phase of the feed-back voltages exist, except that at these frequencies the current $I_{78}$ and the voltage $E_{fb}$ are subject to a leading phase shift.

Figure 8:
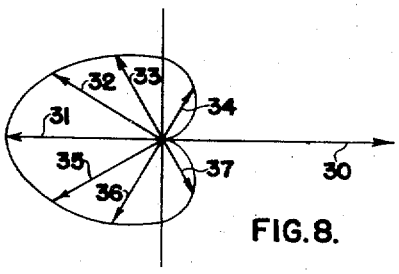

The above relationships are shown graphically in Fig. 8, which is a polar diagram in which the angular co-ordinates represent explicitly the phase angle (and implicitly the frequency) of the feed-back voltage relative to the voltage across the circuit 5—6, for any given frequency, and the radial co-ordinates represent the relative amplitude of the feed-back voltages. In the diagram, the vector 30 may be considered as the reference vector representing the voltage across the input circuit 5—6, so that the vector 31 represents the feed-back voltage at the mean resonant frequency of the system. The voltage vectors 32, 33, and 34 represent the relative feed-back voltages for frequencies increasingly higher than the mean resonant frequency of the system, while the vectors 35, 36, and 37 represent the relative feed-back voltages for frequencies increasingly lower than the mean resonant frequency. From this vector diagram it will be seen that, at frequencies in the vicinity of the mean resonant frequency of the system, the vectors representing feed-back voltages are substantially opposite in phase to the reference vector 30 representing the input voltage across circuit 5—6 and, therefore, the feedback is degenerative. However, at frequencies considerably above and below such mean frequency, the phase of the vectors representing feed-back voltages approaches that of the reference vector and the system is regenerative. Stated in another way, when the vector difference between the voltage $E_5$ across the input circuit 5—6 and the feed-back voltage $E_{fb}$, which difference may be termed the driving voltage or the voltage which would appear across the circuit 5—6 in the absence of any feedback, is less than the voltage $E_5$, the system is regenerative, while the system is degenerative when this difference is greater than the voltage $E_5$.

In other words, the backward coupling between circuits 5—6 and 7—8 through tubes 15 and 4 operates to decrease the responsiveness of the system at frequencies within the band and in the vicinity of the resonant frequencies of the two circuits and to increase the responsiveness of the system symmetrically at frequencies substantially above and below the mean resonant frequency. As used in this specification, a system in which the response is substantially symmetrical about the mean frequency of the band is defined as one in which the response characteristic has the same general form on each side of the mean frequency of the system. The response characteristic may be one having a pronounced peak on each side of the mean frequency, and in the prefered form, the peaks have the same amplitude.

Figure 9:
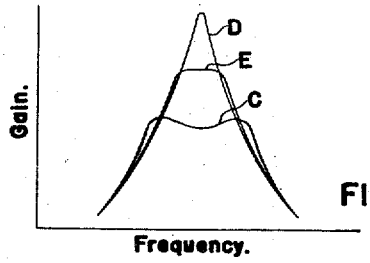

The effect which may be procured by varying the transconductance of tube 15 to vary the amount of backward coupling is illustrated graphically by the family of curves C, D, and E of Fig. 9, which represent the response characteristic of only the selector 5—6, 7—8 and the feed-back path. Curve D corresponds to zero backward coupling due to substantial cutoff of tube 15. When the bias potential of tube 15 is adjusted in response to the A. V. C. action of the system to increase the transconductance of tube 15 to an intermediate value, the characteristic curve of the selector system is modified to approach curve E. As may be observed from this curve, with small feed-back voltages the degenerative action is appreciable at frequencies near the mean resonant frequency of the system, while the phase and magnitude of the feed-back voltage components of frequencies above and below the mean resonant frequency are such that the regenerative action is not considerable. A further increase in the transconductance of tube 15 to increase the feed-back voltage causes an increase in the amplitude of the feed-back components to modify the response characteristic of the system to that in which the feedback is considerably regenerative at frequencies substantially displaced from resonance, shown by curve C, accentuating the double peaks on either side of the mean resonant frequency.

From an inspection of the family of curves illustrated in Fig. 9, it will be appreciated that the improved selector system described provides a simple means for easily adjusting the selectivity of the receiver of Fig. 2.

One advantage of the adjustable coupling shown in Fig. 2 resides in the fact that the gain through the selector system for all frequencies within the band is lowered as the band is widened. Ordinarily a wide band-pass characteristic is desired with strong signals and the corresponding gain of the selector system is preferably relatively low. However, with weak signals a relatively narrow band and a higher gain are desirable. The family of curves shown in Fig. 9 show that these conditions are satisfied when the band width is adjusted by adjusting the backward coupling between circuits 5—6 and 7—8.

It will be apparent that many changes and modifications may be made in this invention by anyone skilled in the art and without departing from the true spirit and scope of the invention as defined in the following claims.

What is claimed is:

1. In a radio receiver, an amplifier having a predetermined selectivity characteristic and comprising a pair of tuned circuits and a tube coupled to said circuits, means coupling said circuits in the forward direction, an energy feed-back path between said circuits including said tube, a variable grid-bias automatic volume control operable over substantially the entire range of received signal intensities capable of affecting said receiver, means for imposing a positive feedback of energy over said path, said feed-back energy acting jointly with said volume control to alter the selectivity of said amplifier.

2. A band-pass selector system for passing a band of frequencies comprising tuned circuits resonant at frequencies within said band, directive coupling means coupling said circuits in one direction, and separate coupling means coupling said circuits in the other direction, said coupling means being substantially less frequency-selective than said tuned circuits and co-operating with said tuned circuits to provide a coupling reaction between said circuits which is substantially symmetrical about the mean frequency of said band and which is degenerative at frequencies in the vicinity of said resonant frequencies and regenerative at frequencies above and below said resonant frequencies.

3. A band-pass selector system for passing a band of frequencies comprising tuned circuits resonant at frequencies within said band, directive coupling means coupling said circuits in one direction, and separate coupling means coupling said circuits in the other direction, said coupling means being substantially less frequency-seleeitve than said tuned circuits and co-operating with said tuned circuits to provide a coupling reaction between said circuits which is degenerative at frequencies in the vicinity of said resonant frequencies and regenerative at frequencies above and below said resonant frequencies, said coupling means being so proportioned that the system is equally responsive to frequencies displaced equally above and below the mean resonant frequency of the system.

4. A band-pass selector system for passing a band of frequencies comprising tuned circuits resonant at frequencies within said band, coupling means having directive transconductance for coupling said circuits in one direction, and separate means for coupling said circuits in the other direction, said coupling means being substantially less frequency-selective than said tuned circuits and co-operating with said tuned circuits to provide a coupling reaction between said circuits which is substantially symmetrical about the mean frequency of said band and which is degenerative at frequencies in the vicinity of said resonant frequencies and regenerative at frequencies above and below said resonant frequencies.

5. A band-pass selector system for passing a band of frequencies comprising tuned circuits resonant at frequencies within said band, coupling means including a vacuum tube repeater coupling said circuits in one direction, and separate coupling means coupling said circuits in the other direction, said coupling means being substantially less frequency-selective than said tuned circuits and co-operating with said tuned circuits to provide a coupling reaction between said circuits which is substantially symmetrical about the mean frequency of said band and which is degenerative at frequencies in the vicinity of said resonant frequencies and regenerative at frequencies above and below said resonant frequencies.

6. A band-pass selector system for passing a band of frequencies comprising input and output circuits resonant at frequencies within said band, means comprising mutual reactance for coupling said circuits in the forward direction and directive means coupling said circuits in the backward direction, said directive means being substantially less frequency-selective than said input and output circuits and co-operating with said input and output circuits to provide a coupling reaction between said circuits which is substantially symmetrical about the mean frequency of said band and which is degenerative at frequencies in the vicinity of said resonant frequencies and regenerative at frequencies above and below said resonant frequencies.

7. A band-pass selector system for passing a band of frequencies comprising input and output circuits resonant at frequencies within said band and each including frequency-determining inductance and capacitance elements, means comprising mutual inductance between said inductance elements for coupling said circuits in the forward direction and directive means coupling said circuits in the backward direction, said directive means being substantially less frequency-selective than said input and output circuits and co-operating with said input and output circuits to provide a coupling reaction between said circuits which is substantially symmetrical about the mean frequency of said band and which is degenerative at frequencies in the vicinity of said resonant frequencies and regenerative at frequencies above and below said resonant frequencies.

8. A band-pass selector system for passing a band of frequencies comprising input and output circuits resonant at frequencies within said band and each including frequency-determining inductance and capacitance elements, means comprising mutual inductance between said inductance elements for coupling said circuits in the forward direction, directive coupling means coupling said circuits in the backward direction, and means in the backward coupling path for shifting the feed-back voltage by approximately 90 degrees, said directive means being substantially less frequency-selective than said input and output circuits and co-operating with said input and output circuits to provide a coupling reaction between said circuits which is substantially symmetrical about the mean frequency of said band and which is degenerative at frequencies in the vicinity of said resonant frequencies.

9. A band-pass selector system for passing a band of frequencies comprising input and output circuits resonant at frequencies within said band and each including frequency-determining inductance and capacitance elements, means comprising mutual inductance between said inductance elements coupling said circuits in the forward direction, and separate coupling means coupling said circuits in the backward direction including a vacuum tube repeater having input electrodes coupled to said output circuit and output electrodes coupled to said input circuit, said coupling means being substantially less frequency-selective than said input and output circuits and co-operating with said input and output circuits to provide a coupling reaction between said circuits which is substantially symmetrical about the mean frequency of said band and which is degenerative at frequencies in the vicinity of said resonant frequencies and regenerative at frequencies above and below said resonant frequencies.

10. A band-pass selector system for passing a band of frequencies comprising a signal-modulated input voltage, said system comprising input and output circuits resonant at frequencies within said band, directive coupling means coupling said circuits in one direction, separate coupling means coupling said circuits in the other direction, said coupling means alone tending to provide a feed-back voltage substantially in phase with said input voltage across said input circuit at frequencies in the vicinity of said resonant frequencies, and additional means included in one of said coupling paths for reversing the phase of the feed-back voltage, said coupling means being substantially less frequency-selective than said terminal circuits and co-operating with said input and output circuits to provide a coupling reaction between said circuits which is substantially symmetrical about the mean frequency of said band and which is degenerative at frequencies in the vicinity of said resonant frequencies and regenerative at frequencies above and below said resonant frequencies.

11. A band-pass selector system for passing a band of frequencies comprising a signal-modulated input voltage, said system comprising input and output circuits resonant at frequencies within said band, means coupling said circuits in a forward direction, directive coupling means coupling said circuits in the backward direction, said coupling means alone tending to provide a feed-back voltage substantially in phase with said voltage across said input circuit at frequencies in the vicinity of said resonant frequencies, and an auxiliary vocuum tube repeater included in one of the coupling paths for reversing the phase of said feed-back voltage, said coupling means being substantially less frequency-selective than said terminal circuits and co-operating with said input and output circuits to provide a coupling reaction between said circuits which is substantially symmetrical about the mean frequency of said band and which is degenerative at frequencies in the vicinity of said resonant frequencies and regenerative at frequencies above and below said resonant frequencies.

12. A band-pass selector system for selectively passing a band of frequencies comprising a modulated-carrier input voltage, said system comprising input and output circuits resonant at frequencies within said band, means coupling said circuits in the forward direction, and directive coupling means substantially less frequency-selective than said circuits coupling said circuits in the backward direction, said coupling means being operative to derive from said output circuit a feed-back voltage and to impress said voltage upon said input circuit, said feed-back voltage having frequency components within said band corresponding to the components of said input voltage, the phase relation between like frequency components of said voltages being variable in accordance with the departure of the frequency thereof from said resonant frequency, whereby the components of said voltages combine to produce degenerative reaction in said repeater at frequencies in the vicinity of the resonant frequencies of said circuit and regenerative reaction at frequencies above and below said resonant frequencies, said reaction being substantially symmetrical about the mean frequency of the pass band of said system.

13. An adjustable band-pass selector system for passing a band of frequencies adjustable in width comprising tuned circuits resonant at frequencies within said band, directive coupling means coupling said circuits in one drection, separate coupling means coupling said circuits in the other direction, said coupling means being substantially less frequency-selective than said tuned circuits and co-operating with said tuned circuits to provide a coupling reaction between said circuits which is substantially symmetrical about the mean frequency of said band and which is degenerative at frequencies in the vicinity of said resonant frequencies and regenerative at frequencies above and below said resonant frequencies, and means for adjusting said coupling reaction to vary the width of the frequency band passed by said system.

14. An adjustable band-pass selector system for passing a band of frequencies adjustable in width, comprising tuned circuits resonant at frequencies within said band, directive coupling means coupling said circuits in one direction, separate coupling means coupling said circuits in the other direction, said coupling means being substantially less frequency-selective than said tuned circuits and co-operating with said terminal circuits to provide a coupling reaction between said circuits which is degenerative at frequencies in the vicinity of said resonant frequencies and regenerative at frequencies above and below said resonant frequencies, and means for adjusting said coupling reaction to vary the width of the frequency band passed by said system, said coupling means being so proportioned that the system is equally responsive to frequencies displaced equally above and below the mean resonant frequency of the system irrespective of the width of the frequency band passed by said system.

15. An adjustable band-pass selector system for passing a band of frequencies adjustable in width comprising tuned circuits resonant at frequencies within said band, directive coupling means coupling said circuits in one directon, separate coupling means coupling said circuits in the other direction, said coupling means beng substantally less frequency-selective than said tuned circuits and co-operating with said tuned circuits to provide a coupling reaction between said circuits which is substantially symmetrical about the mean frequency of said band, and means for adjusting said coupling reaction to vary the width of the frequency band passed by said system and simultaneously to change independently the responsiveness of the system to frequencies within said band.

16. An adjustable band-pass selector system for passing a band of frequencies adjustable in width comprising tuned circuits resonant at frequencies within said band, directive coupling means coupling said circuits in one direction and including means for amplifying currents of frequencies within said band, separate coupling means coupling said circuits in the other direction, said coupling means being substantially less frequency-selective than said tuned circuits and co-operating with said tuned circuits to provide a coupling reaction between said circuits which is substantially symmetrical about the mean frequency of said band, and means for adjusting said coupling reaction to increase the width of the frequency band passed by said system and simultaneously to decrease independently the amplification of frequencies in the vicinity of said resonant frequencies by said amplifying means.

17. An adjustable band-pass selector system for passing a band of frequencies adjustable in width comprising input and output circuits resonant at frequencies within said band, means coupling said circuits in the forward direction, directive coupling means coupling said circuits in the backward drection, said backward coupling means having an adjustable transconductance, said coupling means being substantially less frequency-selective than said input and output circuits and co-operating with said input and output circuits to provide a coupling reaction between said circuits which is substantially symmetrical about the mean frequency of said band and which is degenerative at frequencies in the vicinity of said resonant frequencies and regenerative at frequencies above and below said resonant frequencies, and means for adjusting said transconductance to vary the width of the frequency band passed by said system.

18. An adjustable band-pass selector system for passing a band of frequencies adjustable in width comprising input and output circuits resonant at frequencies within said band, directive coupling means coupling said circuits in one direction, coupling means coupling said circuits in the other direction, one of said coupling means including a vacuum tube having a control electrode and transconductance variable with the bias applied to said control electrode, said coupling means being substantially less frequency-selective than said input and output circuits and co-operating with said input and output circuits to provide a coupling reaction between said circuits which is substantially symmetrical about the mean frequency of said band and which is degenerative at frequencies in the vicinity of said resonant frequencies and regenerative at frequencies above and below said resonant frequencies and which depends upon the value of said transconductance, and means for adjusting the bias on said control grid to vary the width of the frequency band passed by said system.

19. A band-pass selector system for passing a band of frequencies comprising tuned circuits resonant at frequencies within said band, mutual reactance coupling said tuned circuits normally to provide a broad pass band, directive coupling means coupling said circuits in the backward direction, means for effecting a feedback of energy over said directive coupling means which is regenerative at frequencies in the vicinity of said resonant frequency and degenerative at frequencies above and below said resonant frequencies, and means for controlling the amount of energy fed back over said path, whereby a wide range of band width control is effected with a minimum change in the amount of feed-back energy.

20. A band-pass selector system for passing a band of frequencies comprising tuned circuits resonant at frequencies within said band, directive coupling means coupling said circuits in one direction, and separate coupling means coupling said circuits in the other direction, said coupling means being substantially less frequency-selective than said tuned circuits and cooperating with said tuned circuits to provide a coupling reaction between said circuits having a phase angle which is effectively a multiple of 180 degrees at frequencies in the vicinity of said resonant frequency and which varies symmetrically for frequencies equally displaced above and below said mean resonant frequency.

21. A band-pass selector system for passing a band of frequencies comprising tuned circuits resonant at frequencies within said band, directive coupling means coupling said circuits in one direction, and separate coupling means coupling said circuits in the other direction, said coupling means being substantially less frequency-selective than said tuned circuits and cooperating with said tuned circuits to provide a coupling reaction between said circuits which is regenerative at frequencies within the vicinity of said resonant frequencies and degenerative at frequencies above and below said resonant frequencies.

22. A band-pass selector system for passing a band of frequencies comprising tuned terminal circuits resonant at frequencies within said band, directive coupling means coupling said circuits in one direction, and separate coupling means coupling said circuits in the other direction, said coupling means being substantially less frequency-selective than said tuned circuits and cooperating with said tuned circuits to provide a coupling reaction between said circuits which is regenerative at frequencies in the vicinity of said resonant frequencies and degenerative at frequencies above and below said resonant frequencies, said coupling means being so proportioned that said system is equally responsive to frequencies displaced above and below the mean resonant frequency of the system.

23. A band-pass selector system for passing a band of frequencies comprising input and output circuits resonant at frequencies within said band, means comprising mutual reactance for coupling said circuits in one direction, and directive coupling means coupling said circuits in the other direction, said directive means being substantially less frequency selective than said input and output circuits and cooperating with said input and output circuits to provide a coupling reaction between said circuits which is regenerative at frequencies in the vicinity of said resonant frequencies and degenerative at frequencies above and below said resonant frequencies.

24. A band-pass selector system for passing a band of frequencies comprising input and output circuits resonant at frequencies within said band, means comprising mutual reactance for coupling said circuits in the forward direction, and directive coupling means coupling said circuits in the backward direction, said directive means being substantially less frequency selective than said input and output circuits and cooperating with said input and output circuits to provide a coupling reaction between said circuits which is regenerative at frequencies within the vicinity of said resonant frequencies and degenerative at frequencies above and below said resonant frequencies.

LESLIE F. CURTIS.